United States Patent [19]

Altshuler et al.

[11] 3,854,324

[45] Dec. 17, 1974

[54] BLOOD CLOTTING TIME AND STRENGTH MEASURING SYSTEM

[76] Inventors: Thomas L. Altshuler, 110 Hillcrest Rd., Concord, Mass. 01742; John H. Altshuler, 5700 Dunbarton Dr., Englewood, Colo. 80110

[22] Filed: June 11, 1973

[21] Appl. No.: 368,970

Related U.S. Application Data

[63] Continuation-in-part of Ser. No. 192,875, Oct. 27, 1971, abandoned.

[52] U.S. Cl. .................. 73/64.1, 23/230 B, 73/64.4, 128/2 G
[51] Int. Cl. ............................................ G01n 33/16
[58] Field of Search ...................... 73/64.1, 64.4, 54; 128/2 G; 356/39; 23/230 B

[56] References Cited
UNITED STATES PATENTS 2,473,553  6/1949  Stokes ................................ 73/64.4
3,380,463  4/1968  Trethewey ......................... 73/54 X

OTHER PUBLICATIONS

Kippenhan, C., et al. A Bubble Growth Experiment for the Determination of Dynamic Surface Tension. In AIChE Journal 16(2): p. 314–316, March 1970.

*Primary Examiner*—Richard C. Queisser
*Assistant Examiner*—Joseph W. Roskos
*Attorney, Agent, or Firm*—Cesari and McKenna

[57] ABSTRACT

The clotting time for a blood specimen is measured by blowing a train of bubbles from a tube immersed in the specimen and then detecting the time of occurrence of an appreciable change in the bubble formation characteristics. The system detects that change by detecting a change in the bubbles or in the reflected pressure profile in an expansible chamber connected to the tube with a pressure sensing device having inertia.

19 Claims, 6 Drawing Figures

PATENTED DEC 17 1974 3,854,324

BLOOD CLOTTING TIME AND STRENGTH MEASURING SYSTEM

RELATED APPLICATION

This application is a continuation-in-part of our co-pending application Ser. No. 192,875, filed Oct. 27, 1971, entitled Blood Clotting Time and Strength Measuring System, now abandoned.

BACKGROUND OF THE INVENTION

This invention relates to a technique for determining the clotting time for blood samples, and, more particularly, to a practical system for measuring that time.

Blood clotting is a very complex phenomenon. Briefly stated, it involves the polymerization of the plasma protein fibrinogen initiated by thrombin, an enzyme produced in the body. This results in the formation in the blood of long strands of fibrin which slow and then stop blood flow. While the "normal" clotting time (i.e., the time it takes for the fibrin to form) may vary from person to person, for the purposes of this description, we will assume that a typical blood sample will begin to clot or coagulate in about 3 minutes.

Clotting time can be changed by various coagulants and anticoagulants which are produced naturally in the body or added to the blood artificially. A commonly used anticoagulant blood additive is heparin and a conventional heparin antagonist is protamine. Both of these substances are administered during operations to control the patient's blood clotting function.

Conventionally, in order to determine whether a patient's blood has a normal clotting time, samples of blood are drawn and then analyzed to measure the person's capability of generating thrombin which is one substance which initiates clotting. Normally, this analysis takes a considerable amount of time so that, for all practical purposes, it has heretofore not been possible to obtain a current picture of the clotting function of a patient's blood. In other words, between the time when a sample of the patient's blood is taken for testing and the time when the test results are available, his blood condition may have changed or been modified by drug administration. Therefore, any action taken on the basis of the test results on the old sample may be incorrect in view of the current condition of his blood.

This problem is particularly serious in connection with long, involved operations such as open heart surgery. In accordance with the usual surgical procedure in this particular case, the patient is given an anticoagulant in order to prevent his blood from clotting as it is bypassed through a heart-lung machine. The dosage depends primarily upon the normal clotting time of the patient's blood and on the amount of blood in his body. Therefore, before surgery commences, a physician must prescribe the proper amount of anticoagulant (heparin) based on the patient's size and tests on his blood. Then, after the operation, an heparin antagonist is usually added to the patient's blood in order to offset the effects of the anticoagulant. Otherwise, the patient may develop bleeding complications from internal bleeding at the site of the operation. This requires another test of the patient's blood to determine the proper dosage of heparin antagonist.

The effects of these drugs vary from patient to patient and are time-dependent. Therefore, doctors have not been able to obtain a true appraisal of the patient's blood function using the prior slow and cumbersome blood analysis techniques. As a result, the blood additive dosages administered to the patients may be too large or too small for his current condition.

There are other problems which arise such as heparin rebound. This is a phenomenon by which the anticoagulant effects of the heparin reoccur after a period of time. This is, before an operation, the patient may be given heparin to inhibit clotting. Then, after the operation, he is given an heparin antagonist to restore the normal blood-clotting function. Sometime later, however, the blood again becomes affected by the original dosage of heparin and behaves as anticoagulated blood so that the patient begins to bleed internally at the site of the operation.

SUMMARY OF THE INVENTION

Thus, the aim of the present invention is to provide a quick, efficient technique for determining the clotting time for a blood specimen.

Another object of the invention is to provide a system for determining whether or not a blood specimen has a normal clotting capability.

A further object of the invention is to provide method and means for measuring the strength of a fibrin network after its formation in the blood, hereinafter referred to as clotting strength.

Another object is to provide a blood clotting time and strength measuring system which requires only very small blood samples, e.g., 0.075 milliliters.

Still another object of the invention is to provide a blood clotting time and clotting strength measuring system which is safe and reliable to use in the operating room or laboratory.

A further object of the invention is to provide a hemotensiometer or blood clotting time and clotting strength measuring system which is relatively easy to make and maintain.

Yet another object of the invention is to provide method and means for agitating and mixing blood in order to maximize contact activation of plasma clotting factors and, hence, to decrease clotting time.

Another objective is to measure the contact activation sequence of blood clotting and to be able to determine clotting factor deficiencies by alterations in clotting strength as measured over a short period of time (1–3 minutes).

Other objects will in part be obvious and will in part appear hereinafter.

The invention accordingly comprises the several steps and the relation of one or more of such steps with respect to each of the others and the apparatus embodying the features of construction, combination of elements and arrangement of parts which are adapted to effect such steps, all as exemplified in the following detailed disclosure, and the scope of the invention will be indicated in the claims.

Briefly, in accordance with our technique, the clotting time of a blood specimen is determined by detecting changes in the formation rate and size of air bubbles formed in the blood due to changes in the fibrin content of the blood as it begins to coagulate. More particularly, we have found that the pressure required to blow the bubbles increases slightly due to the strength of the fibrin network which forms in clotting blood. This pressure increase becomes even more pronounced if there is a pause between bubbles because the fibrin network has more time to form.

In the present system, then, a gas such as oxygen is passed at a constant rate through a restricted orifice into an expansible chamber. This chamber is connected to a tube whose bore is somewhat larger than the orifice that is immersed in a sample of blood.

In order to detect the changes in bubble formation rate, bubble size, and clotting strength, we monitor the reflected pressure in the chamber with a suitable pressure sensing device which has a built-in inertia such as a manometer or pressure transducer. This inertia causes the system to detect only slow pressure oscillations. Thus, the system does not respond to oscillations due to rapid bubble formation prior to clotting. However, the system does respond to the slower oscillations characteristic of the larger, spaced-apart bubbles which tend to form in clotting blood. These slower pressure oscillations are due primarily to the slower bubble formation rate in clotting blood, the formation of fibrin and variations in the volume of the expansible chamber as will be described in more detail later.

Thus, as soon as the system detects these slower pressure oscillations, one knows that the blood specimen is clotting. Further, by observing the peak amplitude of the pressure oscillations, one can obtain an indication of clotting strength.

The gas bubbling through the blood also maximizes contact activation of plasma clotting factors and this feature along with the aforementioned features enables the present system to provide a quick, reliable indication of the clotting time and strength of a blood specimen.

In a slightly different embodiment, we detect change in bubble size from small bubbles prior to clotting to larger bubbles after clotting. This can be accomplished manually by observing the point when the change occurs and measuring the time with a stop watch.

More preferably, the change in bubble size indicating the onset of clotting is detected optically by passing a light beam through the blood sample and sensing the amount of transmitted light with a photocell, light sensitive diode or other such means. When the larger bubbles commence, more light is transmitted through the blood sample.

Using our apparatus, then, a doctor can determine in a few minutes whether or not a patient's blood is normal or whether an anticoagulant antagonist, anticoagulant or plasma factor should be added to offset a particular blood condition. Since the test results are based on the patient's current blood condition, the additive dosage administered on the basis of the test results should be the correct one to just offset the undesirable blood condition. Furthermore, since the test results are available promptly, a condition such as heparin rebound can be detected in time to counteract its effects. Further, only a very small blood sample is required so the patient with a rare blood type is not placed in jeopardy because of undue blood loss.

Thus, our clotting time and clotting strength measuring technique fills a long-felt need both in the operating room and in laboratories and clinics where the rapid analysis of blood specimens is highly desirable.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
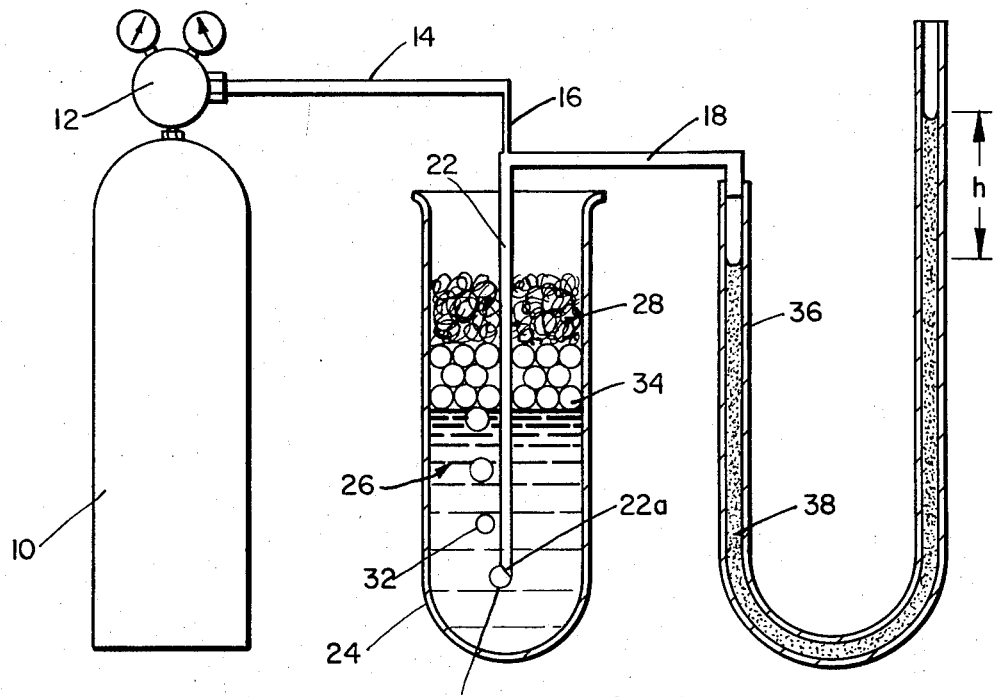
FIG. 1 is a diagrammatic view of a blood clotting time and blood clotting strength measuring system.

Turning now to FIG. 1 of the drawings, a suitable gas which is compatible with blood, e.g., oxygen, air, is stored in a tank 10. The tank is fitted with a conventional flow regulator 12. The gas from the tank is conducted by way of a tube 14 containing a restriction 16 to an expansible chamber 18. From chamber 18, the gas flows through a cannula 22 arranged to extend into an elongated blood specimen container such as a test tube 24.

In use, the test tube contains a blood specimen 26 to an extent that the tip 22a of the cannula is immersed in the blood.

Preferably, also, a plug or wad 28 of stainless steel siliconized wire is placed in the test tube at a short distance above the surface of the blood specimen 26 to minimize the formation of froth at the blood surface.

When the gas supply 10 is turned on, gas flows at a uniform rate through the restriction 16 into chamber 18. Preferably the flow rate should be between 5 and 10 cc/min. The gas then passes through cannula 22 and is released from tip 22a well below the surface of the blood sample 26, thus forming a bubble 30. After the bubble 30 reaches its maximum size which depends upon the surface tension of the blood, the presence of fibrin, and blood viscosity, the bubble 30 pinches off and a new bubble forms. The tip 22a is cut on a bias to facilitate separation of the bubble 30.

Thus, a train of bubbles 32 forms and these rise to form a raft of bubbles 34 between the blood surface and the wire plug 28. The restriction 16 is included in the gas line to insure constant gas flow into the cannula 22 despite pressure fluctuations in the cannula as each bubble 30 forms.

The pressure required to blow each bubble 30 is reflected in a pressure within the chamber 18. This pressure is monitored by a pressure sensing device. In the illustrated embodiment, this device is a manometer 36 containing fluid 38. The manometer fluid 38 becomes displaced by gas within chamber 18 until the difference between the two fluid levels in the two legs of the manometer, i.e., the manometer head h, coincides with the average chamber pressure.

Due to the inertia of fluid 38, when the chamber 18 pressure oscillates rapidly, the manometer level remains steady at a head h equal to the average chamber pressure. On the other hand, when the chamber 18 pressure oscillates slowly enough, the head $h$ will vary. Thus, the system may be "tuned" to respond to a desired chamber pressure oscillation frequency such as by adjusting the fluid 38 mass per unit area.

When the pressure increases, displacement of the manometer fluid 38 also causes an increase in chamber 18 volume. Therefore, under certain conditions to be described presently, it is possible for all of the gas flowing through the restriction 16 to flow into the chamber 18 while no new bubbles 30 are formed at tip 22a.

Figure 2:
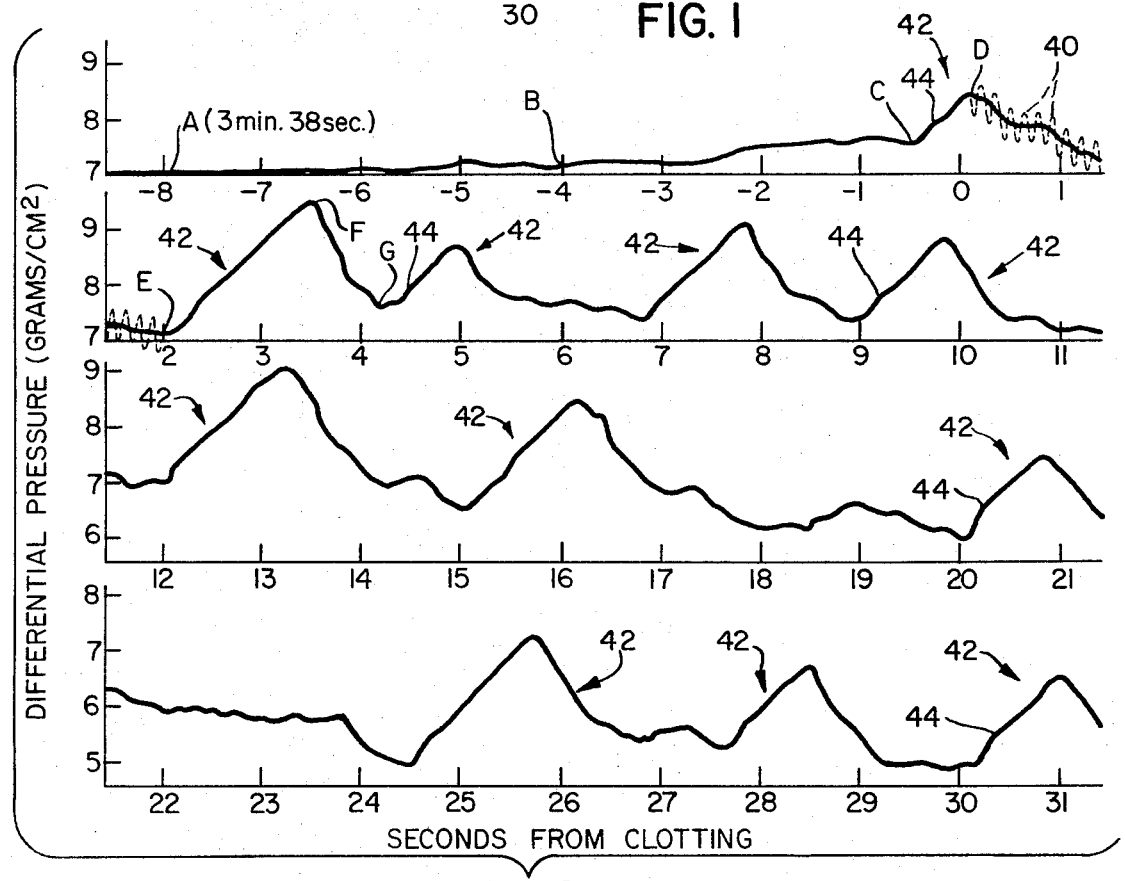
FIG. 2 is a graph illustrating a typical readout of the FIG. 1 system.

FIG. 2 shows the pressure readout of the manometer 36 during a coagulation test. A single curve is illustrated which is broken up into four segments so that a larger scale can be used for clarity. The blood specimen was taken from the patient approximately 3 minutes and 38 seconds prior to the time at point A at the beginning of the curve. At this point, the blood has not yet begun to clot so that relatively small bubbles are formed at tip 22a at a relatively rapid rate, e.g., between 20.0 and 40.0 bubbles per second. This rapid bubble formation gives rise to rapid pressure oscillation in chamber 18. However, the manometer 36 does not respond to these rapid oscillations due to the inertia of its fluid 38. Accordingly, the pressure head $h$ of the manometer remains steady at about 7 centimeters which corresponds to a differential pressure of 7 grams per $cm^2$. This is illustrated by the segment of the FIG. 2 curve between points A and point B.

As the chemical change attending clotting commences, the size of the bubbles generated at tip 22a increases slightly and the bubble formation rate decreases. This is accompanied by a gradual increase in the differential pressure as seen by the curve segment between point B and point C. At this latter point, the clotting process has proceeded to the point where a fibrin network forms over the cannula tip 22a, thereby substantially increasing the clotting strength of the blood there. Accordingly, the pressure required to break this network in order to blow a bubble rapidly increases as seen by the segment of the curve between point C and point D.

As the manometer head $h$ increases, the chamber 18 volume increases correspondingly. This additional chamber 18 volume is able to accommodate the gas flowing through restriction 16 so that no bubbles are formed at tip 22a during the time interval between points C and D.

Ultimately, the force of the gas on the blood at the cannula tip 22a exceeds the clotting strength of the blood (corresponding to point D in FIG. 2) and the fibrin network breaks so that a burst of small bubbles issues from tip 22a. These bubbles can be observed visually. However, their formation rate is so rapid that they do not produce readily detectable oscillations, one per bubble, in the manometer reading. As soon as this burst of bubbles commences, however, the pressure in chamber 18 drops drastically as seen in the FIG. 2 curve segment between point D and point E. The pressure at point E corresponds to the surface tension of the blood specimen.

Actually, if motion pictures are taken of the test tube, small bubbles form and can be observed at about 0.1 second apart which represent the burst of bubbles noted above. If the manometer had no inertia, the head $h$ would fluctuate, one oscillation per bubble. These small, rapid fluctuations are indicated in dotted lines at 40 between points D and E of the FIG. 2 curve. These fluctuations commence when the fibrin network breaks at point D and cease when the pressure in chamber 18 drops to the blood surface tension pressure at point E.

When the pressure drops, a new fibrin network begins to form over cannula tip 22a. Again, the pressure in chamber 18 increases, causing a volumetric increase in the chamber which accommodates the gas flowing through restriction 16. Accordingly, as before, no bubbles are formed in cannula tip 22a as the pressure increases to a maximum at point F in FIG. 2. As soon as the pressure reaches this maximum value, the force on the fibrin network at cannula tip 22a is sufficient to break it so that a second burst of bubbles ensues, causing a rapid drop in pressure as indicated in the curve segment between points F and G.

This process continues so that the output of the system is a series of pressure peaks 42 which are spaced 2-4 seconds apart. As seen from FIG. 2, these peaks vary somewhat in amplitude since each fibrin network which forms at cannula tip 22a has somewhat different characteristics. However, the spaced-apart peaks 42 do have relatively high amplitude and are readily observable.

The leading edge of each peak 42 has a substantially constant slope except that a slight hump 44 is present on some of them due to the dynamics of the system. Also, in FIG. 2, there appears to be a downward pressure trend in the curve. This is because there was some adhesion of this raft to the sides of the test tube, causing a reduction in the pressure head.

Since the peaks or oscillations 42 only form in clotting blood, the commencement of these peaks indicates that the blood is clotting. Thus, as soon as the operator sees the fluctuations commence (i.e. the first peak 42), he knows that the blood is clotting. Thus, by measuring the elapsed time from when the specimen is drawn from the patient until the occurrence of the first peak 42, the operator can determine the blood clotting time of that particular specimen. In the case of the specimen referred to in connection with FIG. 2, then, the elapsed time is 3 minutes and 46 seconds, i.e., the time until point A, plus the time between points A and D. The particular specimen on which the FIG. 2 curve is based is normal blood and the indicated time is a normal clotting time. On the other hand, if the peaks 42 commenced at 1 minute or 5 minutes, this would indicate that the particular blood specimen is not normal.

With our technique, then, the measurement of clotting time is accomplished within a few minutes after a specimen is taken from a patient. Also, the results are accurate, unambiguous and reliable. Therefore, proper remedial action can be taken immediately to bring the clotting function of the patient's blood back to normal, or to a desired value.

The output of our system also provides an indication of the clotting strength of a blood specimen. More particularly, the difference between the maximum and minimum pressure values at a peak 42 is proportional to the blood clotting strength at that time. Thus, clotting strength can be measured simply by noting the pressure of the oscillation peaks 42.

We should mention at this point that when gas is bubbled into a blood specimen 26 in test tube 24, the entire specimen begins to clot, not just that portion in the vicinity of tip 22a. Further, the portion of the specimen 26 remote from tip 22a is not disturbed by the bubbles of gas. Therefore, the fibrin network there tends to grow more rapidly than in the region around tip 22a. Therefore, the blood clotting strength of the undisturbed blood tends to be much greater. Provision is made in the present system for moving test tube 24 relative to the cannula 22 so that the clotting strength of this undisturbed blood can be measured. This measurement may be of considerable clinical value in assessing the degree of normality of the particular blood specimen.

In an automated version of our system, the manometer can be replaced by a pressure transducer of the capacitance type or other type whose volumetric change with pressure is very small. The output of the transducer then drives a strip chart recorder. In this event, the expansible chamber comparable to chamber 18 in FIG. 1 can be a flexible, resilient expansible member such as a bellows cell, an elastic tube or the like, or a constant volume chamber which provides the same function. Also, the pressure transducer may have some built-in inertia for the reasons discussed above.

In this automated version, it is advantageous to provide a filter between the transducer and strip chart recorder which can be switched in or out of circuit. Then, with the filter not active, the system responds to the pressure fluctuations due to the rapid formation of bubbles in unclotted blood. Accordingly, the pressure peaks required to blow the bubbles prior to clotting can be measured and the surface tensions of the unclotted blood calculated from these values. On the other hand, with the filter placed in circuit, the system responds only to the slower pressure fluctuations characteristic of clotting blood so that its output curve remains constant until the blood begins to clot. With the filter active then, the clotting time of the specimen can be detected easily by observing the time at which these slower fluctuations commence, as described previously.

In some applications, a valve may be located in the gas line as a substitute for the bellows or other expansible chamber. The valve is arranged to open and close automatically at short intervals, e.g., about 1 second. This valve then provides successive bursts of bubbles at the cannula tip. In the time interval between the bursts, fibrin has time to form at tip 22a as described previously. Prior to clotting, the pressure required to cause these bursts to commence is relatively low, i.e., proportional only to the surface tension of the blood. After clotting commences, however, the required pressure is higher, i.e., proportional to the surface tension of the blood and the clotting strength thereof combined. Therefore, the clotting time of a specimen can be measured by noting the time at which the pressure increase occurs, as described above.

A substantially constant flow rate is not required to practice applicants' technique. All that is required in order for the present system to operate properly is a sufficient gas flow to form bubbles in the blood and an ability to discriminate between fluctuations in the pressure within chamber 18 due to changes in the gas flow from the supply and pressure changes due to the formation of bubbles at the cannula tip 22a.

For example, the gas flow from tank 10 may be made to vary up and down over a given range in a sinusoidal manner. As long as the frequency of such change is materially less than the bubble formation frequency, one is still able to clearly discriminate between the relatively low frequency pressure fluctuations due to bubbles blown in clotting blood and the higher frequency pressure fluctuations characteristic of bubbles blown in unclotted blood. It is only when the gas flow of tank 10 fluctuates at a frequency approximating that of the bubble formation that the desired pressure effect in chamber 18 would be masked.

Similarly, the gas flow rate from tank 10 can be made to increase gradually or decrease gradually over a range and still the pressure change due to the flowing of bubbles in clotted and unclotted blood is discernible by observing a differential pressure versus time curve similar to the one shown in FIG. 2. The present system basically indicates the change in frequency of the bubble formation in blood. Any one of the many filter devices well known in the mechanical and electrical arts can be used to selectively accept desired frequency signals and reject others.

Manometer dynamics and the effect of clot formation can be deduced from FIG. 2. After a burst of bubbles, point E, a fine fibrin network formed at the inner surface of the tube is at its bottom end. The pressure had to increase to break this network, but the rate of growth of fibrin was greater initially than the rate of pressure increase. The inertia of the manometer fluid caused its level to fluctuate slightly from a straight line during this pressure increase, points E and E', and was finally damped out by point E''. When the force due to gas pressure exceeded the strength of the fibrin network, point F, some filaments broke. The bubble thus expanded and other filaments broke. This was then followed by a cascade of bubbles.

It is assumed that the breaking strength reaches a maximum value when the first bubble of a cascade reaches a diameter equal to the internal diameter of the tube $D_t$ (centimeters). Furthermore, the fibrin breaking strength is assumed to be proportional to the tube circumference, so that the clotting strength $\sigma_c$ (dynes/centimeter) may be defined as the breaking strength per unit length of attachment to the tube. Using a treatment similar to the one described in Walter J. Moore, Physical Chemistry. Englewood Cliffs, N.J.: Prentice-Hall, 1950, pp 484–486. for surface tension $\sigma_s$, but using an effective resistance to bubble expansion ($\sigma_s + \sigma_c$) instead, the maximum bubble pressure $P_b$ (grams/square centimeter) is $$P_b = [4 \cdot (\sigma_s + \sigma_c)/980 D_t] + (ghp/980).$$

(1)

Here, $g$ is the acceleration of gravity (980 cm/s²), $h$ is the depth (centimeters) of the end of the tube below the surface of the blood, and $p$ is the density grams/cubic centimeter of the blood. If the manometer oscillation rate is sufficiently low so that the fluid dynamics can be neglected, then the gauge pressure $P_d$ may be assumed equal to the bubble pressure. This situation exists after clotting for the apparatus shown in FIG. 1.

The oxygen flow rate through the inlet tube V (milliliter/minute) is assumed to be constant. For a final bubble diameter of $D$ (centimeters) in which the number of bubbles blown per second is $n$, $$D = (V/10\, n)^{1/3}.$$

(2)

For the data of FIG. 2, $h=2.55$ cm, $D_t = 0.0584$ cm, $p = 1.057$ gm/cc, and $V = 6.72$ ml/min. Surface tension measurements made for whole blood with no additives, heparinized blood, and serum were all the same, i.e., $\sigma_s = 67$ dyn/cm. Before clotting, the differential pressure was 7.0 gm/cm², while the maximum bubble pressure, calculated from (1), was 7.43 gm/cm². The bubble rate was 5.6 bubbles/s with average diameters of 0.34 cm. From (1), the clotting strength was 15.4 dyn/cm.

Figure 3A:
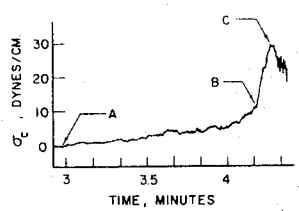
FIG. 3A and B are graphs of clotting strength versus time further illustrating the invention.

Tests were performed with a later model of the hemotensiometer in which a strip chart recorder was used. Blood sample size was 1.5 ml and the air flow rate was 16 ml/min for each test. Here, $n = 30$ bubbles/s prior to clotting. Precision of determining the clotting time was within 1 percent and reproduceability of that time for a number of samples taken from the patient was within ±5 percent. FIG. 3A shows a tracing from a chart taken from normal blood removed and immediately tested. Point A shows the unclotted state, point B the onset of clotting, and point C the fully clotted condition. The clotting time was 4 min 16 s, while the clotting strength was 29 dyn/cm. The first visual observation of clotting was noticed at point C.

Figure 3B:
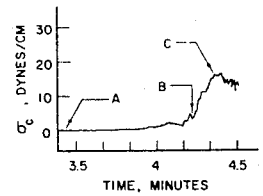

Blood taken from a heparinized patient on the cardiopulmonary by-pass is shown in FIG. 3B. The blood, which contained 0.03 mg heparin/ml, was neutralized with 0.04 mg protamine/ml, and 0.002 mg kaolin was used to accelerate the clotting. The sample was tested immediately. Here, point A shows the unclotted state, point B the onset of clotting, and point C the fully clotted state. The clotting time was 4 min 22 s and the clotting strength was 16 dyn/cm. Other tests showed similar tracings. The reason for the abnormally low clotting strength of heparinized blood from patients on cardiopulmonary by-pass is not yet established. It probably is due to post-pump thrombocytopenia and partial destruction of clotting factors. Heparin by itself does not affect clotting strength.

A series of tests were performed to determine the effect of protamine upon the clotting time of heparinized whole blood. The patient, a 148-lb female whose height was 62 in., was tested for clotting time prior to heparinization. The clotting times for three tests were 317, 290, and 338 s, with an average of 315 s (5 min 15 s). The patient, whose total blood volume was calculated to be 3.79 1 was then given 272 mg of heparin and put on the cardiopulmonary bypass with a prime of 2.5 1. A second heparin dose of 42 mg was given 28 min later. One hour after the original heparin dose, 15 ml of blood was taken and kept in a polyethylene syringe until testing. Ten clean glass test tubes had been prepared with different amounts of protamine sulfate. Also, each test tube has 0.002 mg of kaolin. At the time of running a clotting time test, a 1.5-ml sample, taken from the 15-ml supply, was placed into one of the test tubes and inserted into the hemotensiometer. This was repeated for the 10 tubes, the results of which are given in FIG. 4. The first test was run immediately after phlebotomy, while the last test terminated 108 min later. To eliminate the effect of time, the samples were run in random order, shown as numbers adjacent to data points. Thus number 1 represents the data point for the first sample, number 2 for the second, etc. The normal clotting time is also given as a reference. This test had a sensitivity to detect 1 mg (100 units) heparin per liter of blood volume. As can be seen, the clotting time for proper protamine neutralization is under 5 min. for patients that had normal blood clotting times prior to heparinization. With excessive heparin, the curve appears parabolic and becomes asymptotic to the 0.025 mg/ml protamine neutralization position. Smaller amounts of protamine had no effect upon the clotting time, so that the effective clotting time of the patient was infinite. Above 0.045 mg protamine/ml, which was the proper neutralizing dosage, the clotting time curve increased linearly. This figure explains why the neutralizing dosage of protamine is critical. Assuming that 1.4 times as much protamine is required to neutralize haparin, the heparin concentration was calculated to the 0.032 mg/ml, or 202 mg in the patient and bypass. Thus the heparin half-life was determined to be 86 min.

Figure 4:
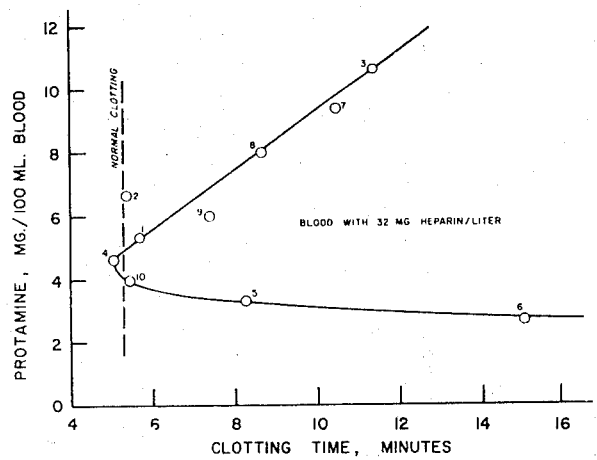
FIG. 4 is another graph of neutralization versus time.

Another hemotensiometer was used to monitor the patient at the same time that the tests were run in FIG. 4. This second instrument had the capability of running four tests simultaneously. It had an air pump instead of the gas tank 10 of FIG. 1. Here, each test tube had 0.002 mg kaolin and differing amounts of protamine sulfate, i.e., 0.04, 0.06, 0.08, and 0.10 mg. Results were similar to those shown in FIG. 4. By noting which test tube sample clotted first, approximate values of the amount of circulating heparin within the patient were determined. It was assumed that the knee of the protamine-clotting time curve such as shown in FIG. 4 occurred in one of the test tubes. Thus results were obtained within 5 min of phlebotomy. By waiting until all the samples clotted, rarely longer than 10 min, curves similar to FIG. 4 could be drawn to yield more accurate results.

After the patient was taken off of the bypass, she was neutralized with protamine sulfate. Over-protaminization was prevented by giving the patient an initial dose slightly less than calculated for perfect neutralization. Then a test was performed using two clean glass test tubes, one with 0.005 mg protamine sulfate in 0.05 ml saline and the other with only 0.05 ml saline. No kaolin was used in such tests. When the test tube containing the protamine clotted first, an additional 15 mg of protamine sulfate was administered. When the test tube containing only saline clotted first, the patient was considered neutralized. In this manner, her clotting time was monitored for 2 h after the initial protamine dose. She was observed to have heparin rebound and was given additional protamine to restore her blood to normal clotting times.

Significant hemorrhage after cardiopulmonary by-pass has been a major postoperative cause of morbidity. This primarily is due to improper heparin neutralization. By using the hemotensiometer in 105 consecutive oper-heart cases, all of whom were monitored during and after surgery, there have been no hemorrhagic deaths. Clotting time measurements were made with samples of heparinized blood taken from the patient and then neutralized in vitro with protamine; and results always obtained within 5 min of phlebotomy. The average heparin half-life was 102 min with a range of 96–129 min at an average body temperature of 32°C. Heparin rebound was noted in almost every case, but in no instance occuring more than 2 h 12 min after the original protamine neutralization. After neutralization, the average blood loss per case has been 5.8-cc/kg body weight in 24 h, representing 7.9 percent of blood volume in 24 h. This is about one-third of the lowest average found in the literature. Because of accurate protamine neutralization of heparin by hemotensiometric monitoring, mechanical bleeders are differentiated easily from bleeders resulting from the disturbance of the coagulation mechanism. Six out of the 105 patients were so diagnosed, reexplored, and found to have atriotomy or arteriotomy bleeding sites. Surgical control of bleeding was effected and hemostasis returned to normal.

Initial experiments with clotting strength measurements indicate that this parameter may be of value diagnostically, especially in acquired bleeding disorders such as disseminated intravascular coagulation syndrome (DICS), where clotting strength is reduced. Recovery of patients with DICS can be predicted by an increase in clotting strength. This trend occurs before other laboratory tests show normalization.

Figure 5:
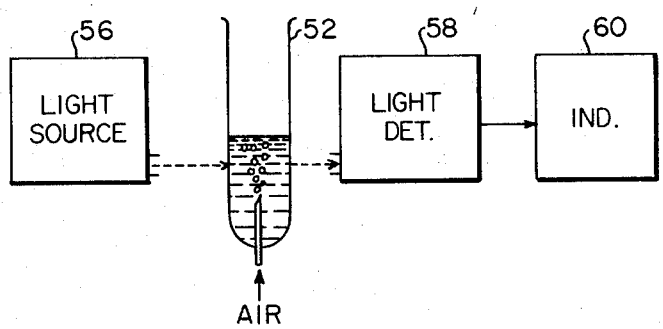
FIG. 5 is a diagrammatic view of another invention embodiment.

Instead of the needle 22 of FIG. 1 entering the test tube 24 from the top, a test tube of plastic, glass, or metal can be made with a needle passing through the bottom of the test tube pointing upward so that its end 22a is uppermost (see FIG. 5). This end should only be a few millimeters above the bottom of the test tube. Of course, the needle should be affixed to the bottom of the test tube in order to prevent blood 26 from leaking out of the bottom of the test tube. The end of the needle is normally submerged in blood during a test. Also the internal diameter of the needle should be small enough that blood would not run out through the needle, but be held within the needle due to surface tension of the blood when no air is passing through the needle. The object of this embodiment is to provide a disposable container and needle combination. This container-needle combination can be affixed to the blood clotting time and strength measuring apparatus by a Luer tip or other suitable means. After use, the container-needle combination can be discarded.

Turning now to FIG. 5, the bubble size increases from small bubbles prior to clotting to large bubbles after clotting. Accordingly, our technique can rely upon visual observation of the bubble size. Most simply, a stop watch can be started the moment air starts bubbling through the blood and is stopped when the bubble size increases as seen visually, indicating the onset of clotting. The time interval measured by the stop watch is the clotting time which corresponds to the clotting time as measured by the FIG. 1 blood clotting time and strength measuring system.

More preferably, however, this visual means of detecting the onset of clotting is accomplished optically in an automatic way. More particularly, a blood sample is placed in a small test tube 52 with an internal diameter of a few (i.e. two to three) millimeters and made of a transparent solid. Tube 52 is the disposable type described above with an upwardly projecting needle 54. A beam of light from a source 56 is aimed at the bottom portion of the test tube and a photoelectric cell or other light sensing means 58 is placed on the opposite side of the test tube. If the beam of light is small in diameter, it is almost completely absorbed by uncoagulated blood in the test tube. The bubbles blown by air entering needle 54 and passing into that region of the test tube are sufficiently small that blood always obstructs the passage of the beam of light through the test tube.

However, when clotting occurs, the bubble size increases sufficiently to occupy almost the entire diameter of the test tube. This has the effect of pushing up substantially the entire mass of blood from the bottom of the test tube thereby providing a clear passage for the beam of light. The increased intensity of light reaching the photoelectric cell is then used to control a conventional indicating device 60 to display or show the onset of clotting. The system can also be arranged to detect changes in reflected light or other forms of radiant energy caused by changes in bubble size.

Thus, our technique for detecting the commencement of clotting and clotting strength in a blood specimen produces reliable results quite quickly as compared with prior techniques for accomplishing this. Moreover, our apparatus is quite simple and easy to use in an operating room, laboratory, or clinic.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

We claim:

1. The method of detecting the commencement of clotting in a blood specimen comprising the steps of
   A. bubbling a gas below the surface of the specimen,
   B. monitoring the pressure required to blow the bubbles in the specimen,
   C. rejecting the high frequency pressure fluctuations characteristic of bubbles blown in unclotted blood,
   D. detecting only the relatively low frequency fluctuations of the pressure which are characteristic of bubbles blown in clotting blood, and
   E. measuring the time of commencement of the low frequency pressure fluctuations.

2. The method as defined in claim 1 and including the additional step of measuring the magnitude of the low frequency fluctuation peaks so as to obtain an indication of the clotting strength of the blood specimen.

3. The method defined in claim 1 and including the additional step of interrupting the bubbling of gas periodically so as to facilitate the formation of fibrin in the blood at the site of the bubbles.

4. A system for measuring the clotting time and clotting strength of a blood specimen comprising
   A. means for supporting a container for a blood specimen,
   B. means for flowing gas into a blood specimen in the container for generating a train of bubbles in the blood having a relatively uniform first size, said flowing means comprising
      1. a supply of gas under pressure,
      2. a small bore cannula, and
      3. a conduit connecting the supply to the cannula, said conduit including means to insure uniform gas flow into the cannula despite pressure fluctuations in the cannula, and
   C. means for detecting a change in the size of the bubbles blown in the blood begins to coagulate, said detecting means including means communicating with the conduit downstream from the insuring means for sensing the pressure in the conduit, said sensing means responding only to relatively low frequency, high amplitude pressure fluctuations.

5. The system defined in claim 4 and further including

A. a container for the blood specimen, and
B. said supporting means positioning the container so that the flowing means projects into the container.

6. The system defined in claim 5 and further including means for adjusting the flowing means relative to the container so that bubbles can be made to originate at any point in the blood volume in the container.

7. The system defined in claim 5 wherein the flowing means includes a cannula which projects into the container from below and is attached to the container so that the two constitute a disposable unit.

8. The system defined in claim 4 wherein the cannula has an oblique tip.

9. The system defined in claim 4 wherein the uniform flow rate insuring means comprise a restriction in the conduit.

10. The system defined in claim 4 wherein the pressure sensing means is a manometer.

11. The system defined in claim 4 wherein the pressure sensing means is a pressure transducer.

12. The system defined in claim 11 and further including means responsive to the output of the transducer for indicating the pressure as a function of time.

13. The system defined in claim 4 and further including means for interrupting the flow of gas to the cannula periodically so as to facilitate the formation of fibrin in the blood adjacent the cannula tip.

14. The system defined in claim 13 wherein the interrupting means comprise a valve in the gas flowing means which is turned on and off in a cyclical manner.

15. The system defined in claim 13 wherein the interrupting means comprises an expansible chamber communicating with the conduit which can accommodate the gas flow while the fibrin is forming at the cannula tip.

16. The system defined in claim 4 wherein the sensing means has a relatively high inertia.

17. The system defined in claim 4 wherein the detecting means comprise
A. means for directing radient energy through a container for a blood sample, and
B. means for detecting changes in the transmitted or reflected component of the energy when the bubble size changes.

18. The method of determining the clotting time of a blood specimen comprising the steps of
A. bubbling a gas below the surface of the specimen, B. detecting the pressure required to blow the bubbles, and C. detecting the time of commencement of relatively low frequency fluctuations in the pressure required to blow the bubbles, and D. measuring the magnitude of the fluctuation peaks so as to obtain an indication of the clotting strength of the blood specimen.

19. The method of determining the clotting time of a blood specimen comprising the steps of
A. bubbling a gas below the surface of the specimen, B. detecting the pressure required to blow the bubbles, C. detecting the time of commencement of relatively low frequency fluctuations in the pressure required to blow the bubbles, and D. comparing the time of commencement of the pressure fluctuations for the specimen with the time of commencement of similar fluctuations for a specimen of blood having a normal clotting time.

* * * * *